US005189658A

United States Patent [19]

Moses

[11] Patent Number: 5,189,658

[45] Date of Patent: Feb. 23, 1993

[54] DEVICE FOR RECORDING INFORMATION ON AN OPTICAL DATA CARRIER

[76] Inventor: Klaus M. Moses, Am Honigbirnbaum 38, D-6232 Bad Soden 2, Fed. Rep. of Germany

[21] Appl. No.: 656,080

[22] PCT Filed: Jun. 26, 1990

[86] PCT No.: PCT/DE90/00482

§ 371 Date: Mar. 27, 1991

§ 102(e) Date: Mar. 27, 1991

[87] PCT Pub. No.: WO91/00595

PCT Pub. Date: Jan. 10, 1991

[30] Foreign Application Priority Data

Jun. 30, 1989 [DE] Fed. Rep. of Germany ....... 3921470

[51] Int. Cl.[5] .............................................. G11B 11/00

[52] U.S. Cl. .................................... 369/100; 369/111; 365/122

[58] Field of Search ................... 369/100, 13, 15, 111, 369/112, 120, 121, 122; 365/122; 235/454, 456

[56] References Cited

U.S. PATENT DOCUMENTS 4,773,060 9/1988 Shimada et al. .................... 369/100
4,922,462 5/1990 Ikegawa et al. .................... 369/100

FOREIGN PATENT DOCUMENTS 63-41141 2/1988 Japan .
63-115796 5/1988 Japan .

*Primary Examiner*—Janice A. Howell
*Assistant Examiner*—Kiet T. Nguyen
*Attorney, Agent, or Firm*—Eckert Seamans Cherin & Mellott

[57] ABSTRACT

A known film becomes transparent when heated from a first temperature (for example, room temperature) to a second temperature and non-transparent when heated to a third temperature. These changes are reversible. A film of this type is to be used as a record carrier for optical information. The film (A) is passed continuously or stepwise past an erasing device (L), a cooling device (K), a preheating device (V) and a writing device (S). The film (A) can be made either transparent or non-transparent by heating it to different predetermined temperatures. The information can be recorded on the film in either its transparent form in non-transparent surroundings or in its non-transparent form in transparent surroundings. The device can be used together with the film to obtain a "paperless" office, because the recordings can be erased from the films, which can therefore be constantly re-used.

16 Claims, 8 Drawing Sheets

R1 R3 SL R4 S TS4 SE R6
WS A T K G1 K V G2
R2 L TS1 TS2 TS3 WQ W R5 MS IS K R7

TEMPERATURE
TRANSPARENT
OPAQUE
T0
T1
T2
T3

DEVICE FOR RECORDING INFORMATION ON AN OPTICAL DATA CARRIER

The invention pertains to a device for recording information in rows and columns on a data carrier with a film the optical properties of which can be influenced by temperature variation. Starting from an initial temperature (for example, room temperature) and an initial optical state (e.g., opaque), the film can be changed to a second optical state (e.g., transparent) by heating the film to a second temperature. This change can be made permanent by cooling the film back to the first temperature. The change in state can later be reversed by heating the film, which is now in its second state, from the first temperature to a third temperature and then cooling it again. In this process, the second temperature is greater than the first temperature, and the third temperature is greater than the second temperature.

BACKGROUND OF THE INVENTION

A data carrier of this type is already known. European Patents 0 000 868 and 0 014 826 describe a material with reversible fixed and temperature-variable light extinction, which is designed as an erasable data carrier consisting of a pair of substances, which has a decreasing light extinction with increasing heating temperature, for example, on heating from the state of maximum light extinction to a temperature of transparency below a transition temperature, and then cooling to below a low temperature value.

The recording and erasing process can be repeated as often as desired. The recording can be made by finely beamed infrared or luminous radiation or by contact heat. The known data carrier is thus suitable for the erasable recording of numbers, letters, pictures, patterns, etc. The recordings can be made either in transparent form on an opaque field or in opaque form on a transparent field.

The goal of the invention was to develop a suitable device for recording optical information on a data carrier of this type.

SUMMARY OF THE INVENTION

This goal is achieved by the following devices: an erasing device, a cooling device, a preheating device (if necessary) and a recording device. The erasing device heats the film to the third temperature or the second temperature, and the cooling device cools the film to the first temperature. The preheating device heats the film to a fourth temperature between the first temperature and the second or third temperature. The recording device heats the appropriate points on the film to the third or the second temperature, according to the information to be recorded. The sheetlike data carrier passes successively through these individual devices in the order described above. Each of the devices is arranged over the full width of the data carrier. The preheating device is located very close to the recording device or may actually be a part of the recording device. The recording energy is controlled by signals from thermal and/or optical sensing devices. The optical sensors check the information recorded on the data carrier by the recording device.

The erasing device ensures that the data carrier is converted to a well-defined state, independently of its current state. The cooling device cools the data carrier to room temperature. It is possible to dispense with such a cooling device if the temperature around the data carrier is kept suitably low after the erasing process, and the data carrier quickly cools by itself. The purpose of the preheating device is to accelerate the recording process by raising the data carrier to a certain temperature before or during the recording process and maintaining that temperature. However, this temperature may not fall within a temperature range in which the state established by the erasing process is changed. The information to be recorded is then recorded on the data carrier by the recording device. At the end of the recording process, we will have either a nontransparent data carrier, in which the recorded information is visible in transparent form, or a transparent data carrier, in which the recorded information is nontransparent. Since the data carrier is sheetlike, the device of the invention can be equipped with a stacking device that allows sheets to be fed one at a time from one or more magazines for holding data carriers. This makes it possible to achieve a paperless office, since sheets of data carriers containing information that is no longer needed can be loaded into the stacker for re-recording in the recording device. The destruction of confidential information by a paper shredder is no longer necessary because the information is erased by the device of the invention.

The device of the invention is suitable, for example, for the recording of suitable fields on chip cards, for display devices for use as printers, facsimile machines etc. In other words, the device of the invention is suitable for use with any devices or machines which are used for recording optical information and which, in the past, have worked with ordinary paper.

BRIEF DESCRIPTION OF THE DRAWINGS

The invention is explained in greater detail with reference to the specific embodiment shown in the attached drawings.

DETAILED DESCRIPTION OF THE PREFERRED EMBODIMENT

Figure 1:
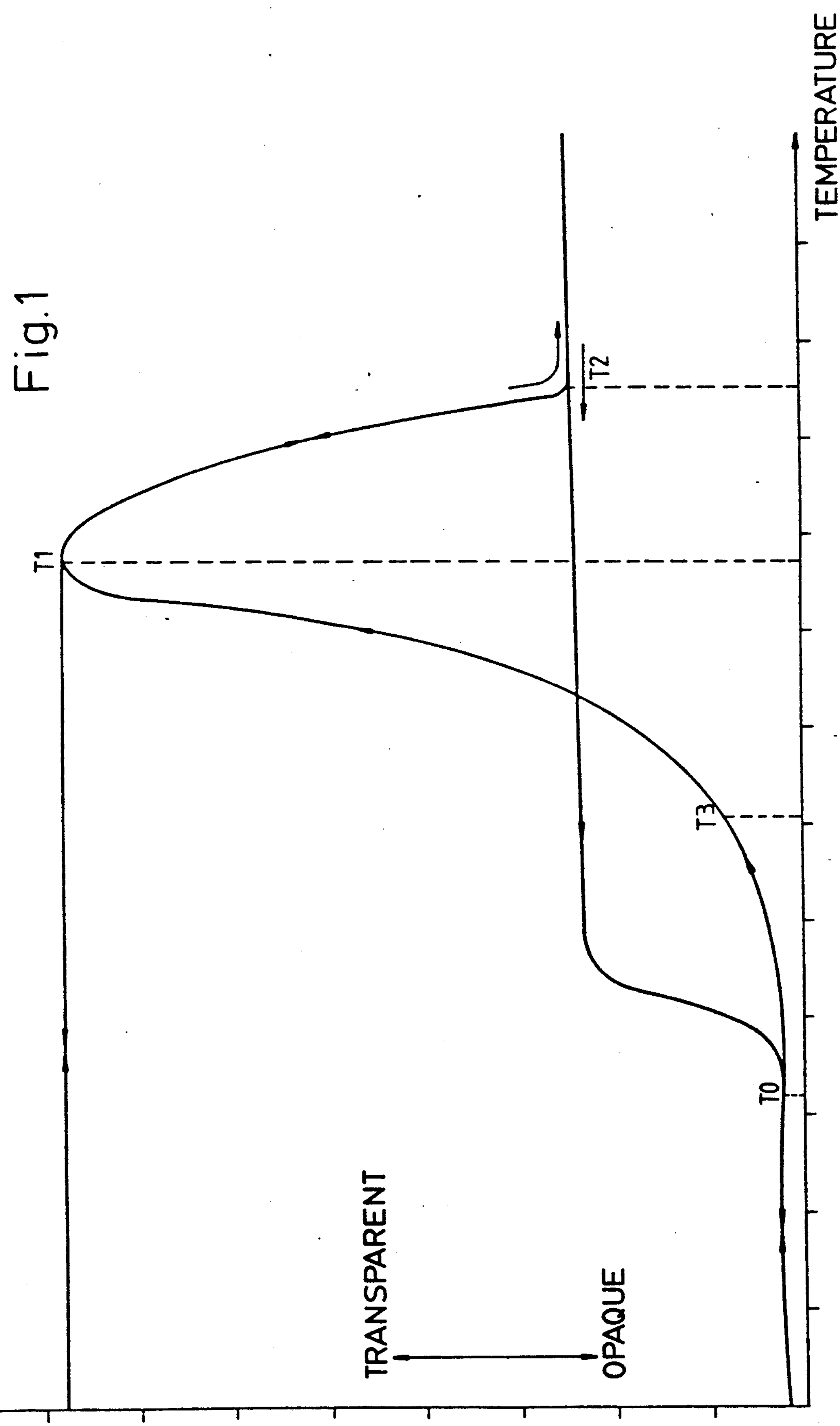
FIG. 1 is a graphic representation of the two states of the film as a function of temperature.

FIG. 1 shows the changes in state as a function of temperature for a possible heat-sensitive film. The graph shows that, starting from a first temperature (ambient temperature), the nontransparent (opaque) state of the material is maintained up to temperature T0, and the transparent state is maintained up to temperature T2. T0 is about +35° C., and T2 is about 73° C. Starting from the opaque state and ambient temperature, the material can be continuously changed in the temperature range between T0 and T1 until a state of maximum transparency is reached. Starting from the transparent state and ambient temperature, the transition to the opaque state at temperature T2 occurs abruptly. Temperature T1 is about 64° C. This characteristic also makes it possible to produce any desired gradations between opaque and transparent by supplying a suitable dose of recording energy.

To record transparent symbols on an opaque field, the data carrier must first be converted to the opaque state. This is accomplished with the erasing device in accordance with the invention by first heating the heat-sensitive layer to at least temperature T2 and then cooling it to temperature T0 or lower.

If the film is subsequently heated to a temperature between T1 and T2, which, for example, is between +64° and +73° C., the layer becomes transparent and remains transparent even after being cooled to ambient temperature.

It is also possible to perform the recording process in the opposite way by first heating the recorded and unrecorded layers to temperature T1, thereby converting them to the transparent state. The information is then recorded at temperature T2, so that the recorded information is then present in nontransparent form on a transparent field.

Figure 2:
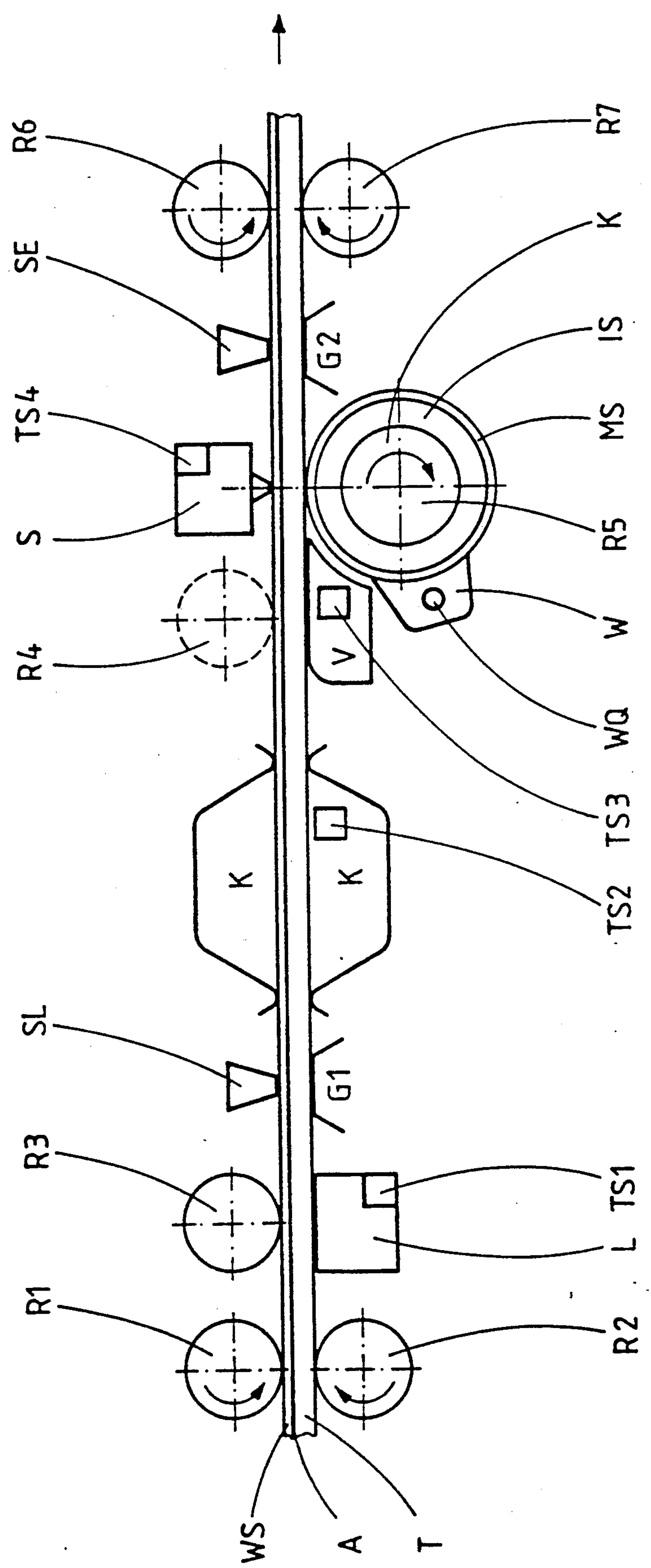
FIG. 2 shows the general arrangement of the individual devices.

The entire device for recording information on a data carrier A is shown schematically in FIG. 2. The data carrier A consists of a support T, the upper surface of which is covered with a heat-sensitive layer WS. The heat-sensitive layer can be converted to different optical states by different temperatures, as was explained with reference to FIG. 1. At least friction rollers R1/R2 and R6/R7 are used to move the data carrier A past the individual devices described below, and additional transport rollers R3, R4 and R5 may also be provided. Transport rollers R1 to R7 can be driven either by individual electric motors or with drives of a few motors combined in groups. The movement can be either continuous or discontinuous, depending on the manner in which the recording process is performed, as will be explained below in greater detail. Additional devices, such as sensors for detecting the presence of a data carrier A and other sensors for ensuring proper initiation of the recording process with respect to the position of the information to be recorded on the data carrier A, A, will not be further discussed in this description of the invention.

The data carrier A engaged by the transport rollers R1/R2 is first fed to the erasing device L, which erases the information recorded on the heat-sensitive layer WS. During the erasing operation, the erasing device, which acts either directly on the layer WS or on the side of the support T facing away from the layer WS, heats the data carrier A, depending on the type of recording (information transparent/field opaque or information opaque/field transparent). The data carrier A is heated either to a temperature between T1 and T2 or to a temperature above T2.

The drive roller R3 can be designed, for example, as a heatable felt roller, but it is also possible to dispense with roller R3 and to press the data carrier A against the erasing device L with a fixed felt surface. The erasing process itself can also be performed, for example, with hot air, and the erasing device L can also be designed as an infrared radiator, as a recording head or as a surface with printed resistors. Like the other devices K, V and S, the erasing device L extends over the entire width of the data carrier A. The erasing device L is equipped with a temperature sensor TS1 to monitor and control its temperature. The drive rollers R1/R2 may also be designed as an erasing device.

After the erasing device L, the data carrier A passes through an optical sensor SL, which extends either partially or completely over the width of the data carrier A. The optical sensor SL, against which the data carrier A is pressed by opposing surface G1, checks the erasing process, since the signals of the optical sensor SL can also be used to control the temperature of the erasing device L. The optical sensor SL can also be designed as a noncontact system with or without optics.

After the erasing process, the data card A is cooled to ambient temperature, e.g., room temperature, in a cooling device K. The cooling process can be performed, for example, by sweeping the data carrier A with air at ambient temperature or with suitably cooled air. It is also possible to move the data carrier A past a suitable plate with Peltier elements or with absorption cooling elements; here again it is necessary to provide a suitable device (not shown) for pressing the data carrier A against the cooling device K. The cooling device K is equipped with a temperature sensor TS2 to monitor the cooling process. The optical sensor SL can also be situated in such a way that the data carrier A is monitored after the cooling process.

The recording of information on the data carrier A or, to be more precise, on the heat-sensitive layer WS is accomplished by the recording device S. Like all of the other devices, the recording device S is mounted in a fixed position, while the data carrier A is moved past it. The recording device can be designed, for example, as heatable resistors, as a gas or solid-state laser or as a high-energy (infrared) light-emitting diode. The design of a so-called thermal head is described, for example, in West German Patent DE-PS 31 25 259. In a thermal head of this type, small resistance elements are arranged in strips or in matrix form on a substrate, which makes it possible to record information on the heat-sensitive layer WS either in the form of points or symbols. In a matrix arrangement, for example, 35 resistance elements may be arranged in 7 rows and 5 columns, so that any desired letter, numeral or symbol can be reproduced. In the recording process, only the resistors corresponding to the symbols to be recorded are heated to record the desired information on the layer WS. This means that, for example, those resistors are heated whose corresponding positions on the layer WS are to be rendered transparent. In the recording of information in the form of symbols, the data carrier A is advanced recording line by recording line. In another type of recording process, only one row of points at a time can be recorded on the data carrier A, the advancement of the data carrier A is continuous or discontinuous, and a complete symbol of a recording line is transferred to the data carrier A only after, for example, 7 rows have been recorded.

In the case of recording by contact heat, the data carrier A can be pressed by a pressure roller R against the recording device S, which is equipped with a temperature sensor TS4. To accelerate the recording process, the data carrier A or the heat-sensitive layer WS can be preheated by a preheating device V. This can be integrated, for example, in the pressure roller R5, which, for this purpose, is provided with a thermally conducting layer MS applied on a thermally insulating core IS. The heat-conducting layer MS is heated by a heating device W with a heat source WQ. This accelerates the recording process performed by the recording device S by preheating the data carrier A or the heat-sensitive layer WS. The preheating device V heats the layer WS of the data carrier A to a fourth temperature, which is between the first temperature T0 and the second temperature T1 or third temperature T2.

Figure 3:
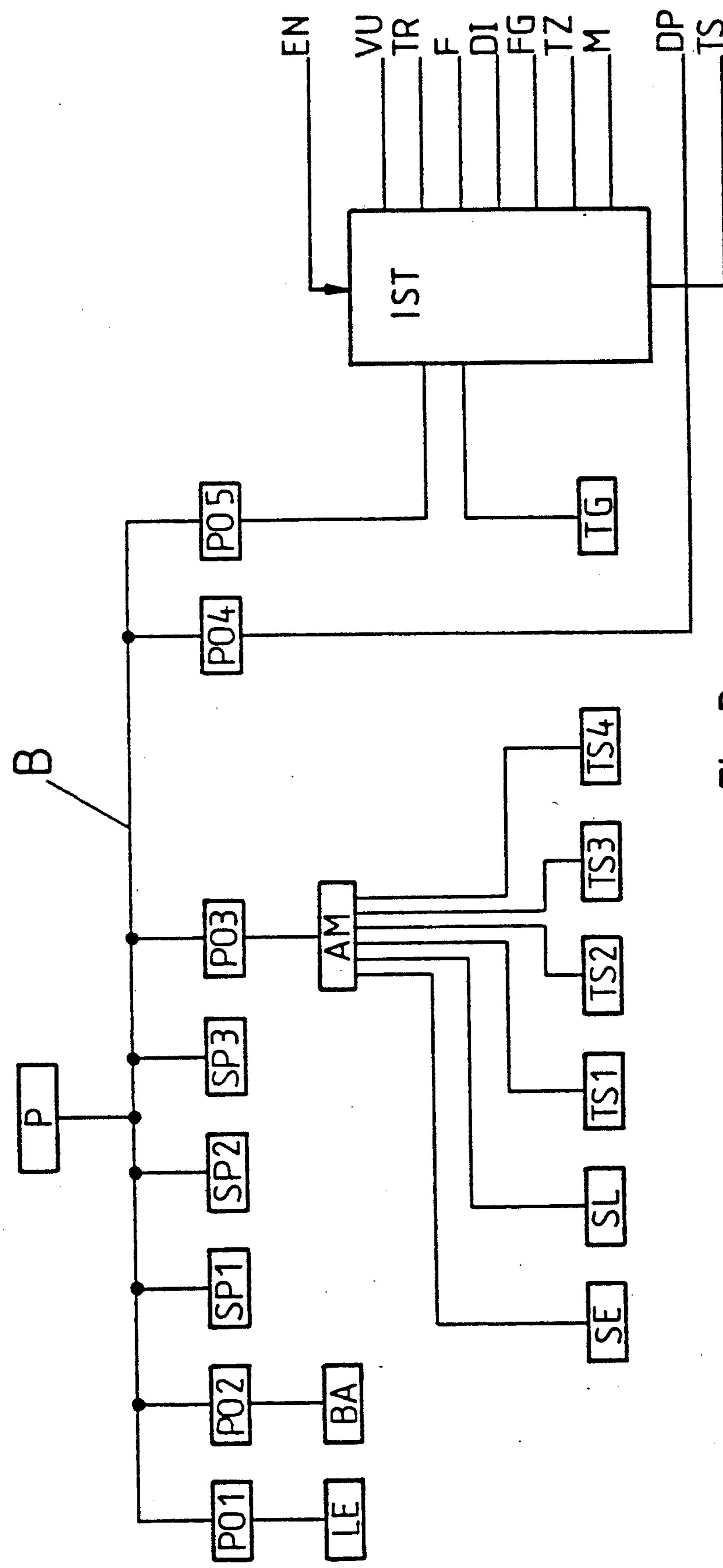
FIG. 3 is the block diagram of the control unit.

The temperature of the preheating device V is monitored by a temperature sensor TS3 and controlled by a processor P (FIG. 3). The signal of the temperature sensor TS3 is used not only to control the supply of energy to the preheating device V, but also to influence the printing parameters. In this way, dynamic fluctuations in the temperature of the preheating device due to the dissipation of heat by the data carrier itself are equalized during the recording process.

The heat source WQ can be designed, for example, as an infrared radiator. It is also possible to place a fixed preheating device V in the direction of movement of the data carrier A in front of or below the recording device S; in whatever form it may be designed, the preheating device is equipped with a temperature sensor TS3.

The information recorded on the heat-sensitive layer WS by the recording device S is monitored by an optical sensor SE, against which the data carrier A is pressed by the opposing surface G2. The optical sensor SE can be designed in the same way as the optical sensor SL. The signals produced by the optical sensor SE control the temperature of the recording device S.

In the control unit of the device of the invention, which is shown in the block diagram in FIG. 3, the control unit serves only to control the internal operating sequences of the erasing or recording process; the treatment of the recorded information itself will not be further discussed in this description of the device of the invention.

The control unit consists of a processor P connected to a bus system B. The information exchange with the periphery and the memories SP1 to SP3 is accomplished through this bus system. The I/O ports PO1 to PO5 serve as interfaces with the periphery. A reading device LE is connected via I/O port PO1. This reading device can be, for example, a chip card reader. The chip card contains printing parameters. When one is dealing with data carriers with different erasing and recording temperatures, corresponding chip cards make it possible for the device of the invention to be adapted to the given data carrier with respect to the erasing and recording temperatures. However, the reading device LE can also be used for reading information recorded on the side of the support T facing away from the heat-sensitive layer WS, for example, information in the form of a bar code. The bar code in turn provides information on the given erasing and recording temperature, and the corresponding printing parameters, which are contained in one of the memories SP1 to SP3, can be selected. Further details on the use of a bar code on the back side of the data carrier may be found in German Patent Application P 39 27 826.3.

A control and display device BA is connected at I/O port PO2. It is used for manual control and adjustment of operating processes and for displaying operating states.

The optical sensors SE and SL and the temperature sensors TS1 to TS4 (FIG. 3) are connected to an analog multiplexer AM, which converts the analog signal to digital signals and sends them to the I/O port PO3, to which it is connected.

As will be explained in greater detail below, an internal sequence control IST controlled by a timer TG is used to control the internal sequences. It is connected to I/O port PO5. The printing parameters are displayed via I/O port PO4, to which line DP is connected. Naturally, the internal sequence control IST can also be integrated in the processor P.

The program of the processor P is stored in one of the memories SP1 to SP3. The processor P processes information from the periphery to produce control commands, which are then sent to the periphery. One of the memories SP1 to SP3 serves as a temporary memory, in which temporary processed information or information waiting to be processed is stored.

Figure 4:
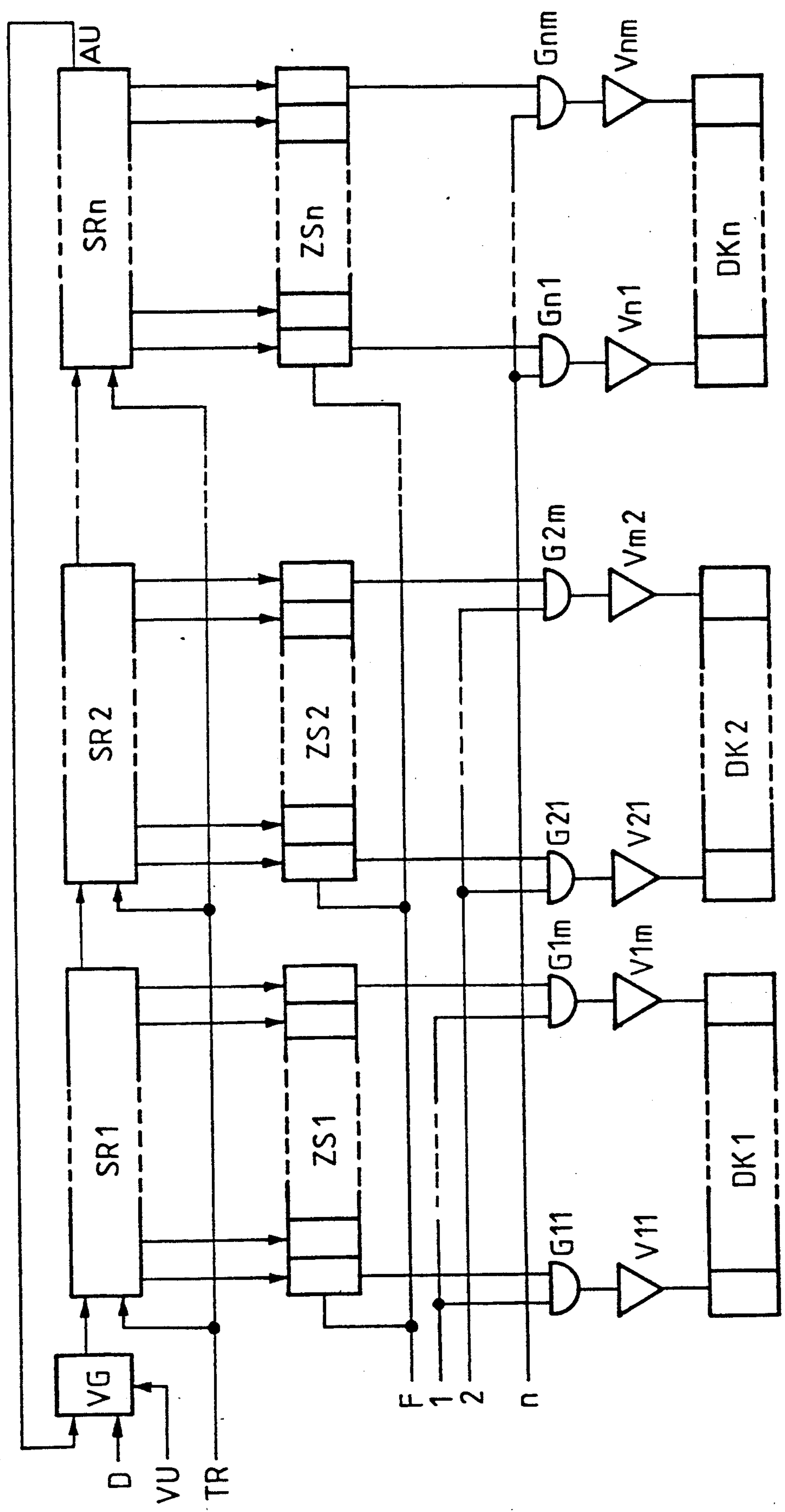
FIG. 4 is the block diagram for processing the printing information.
Figure 5:
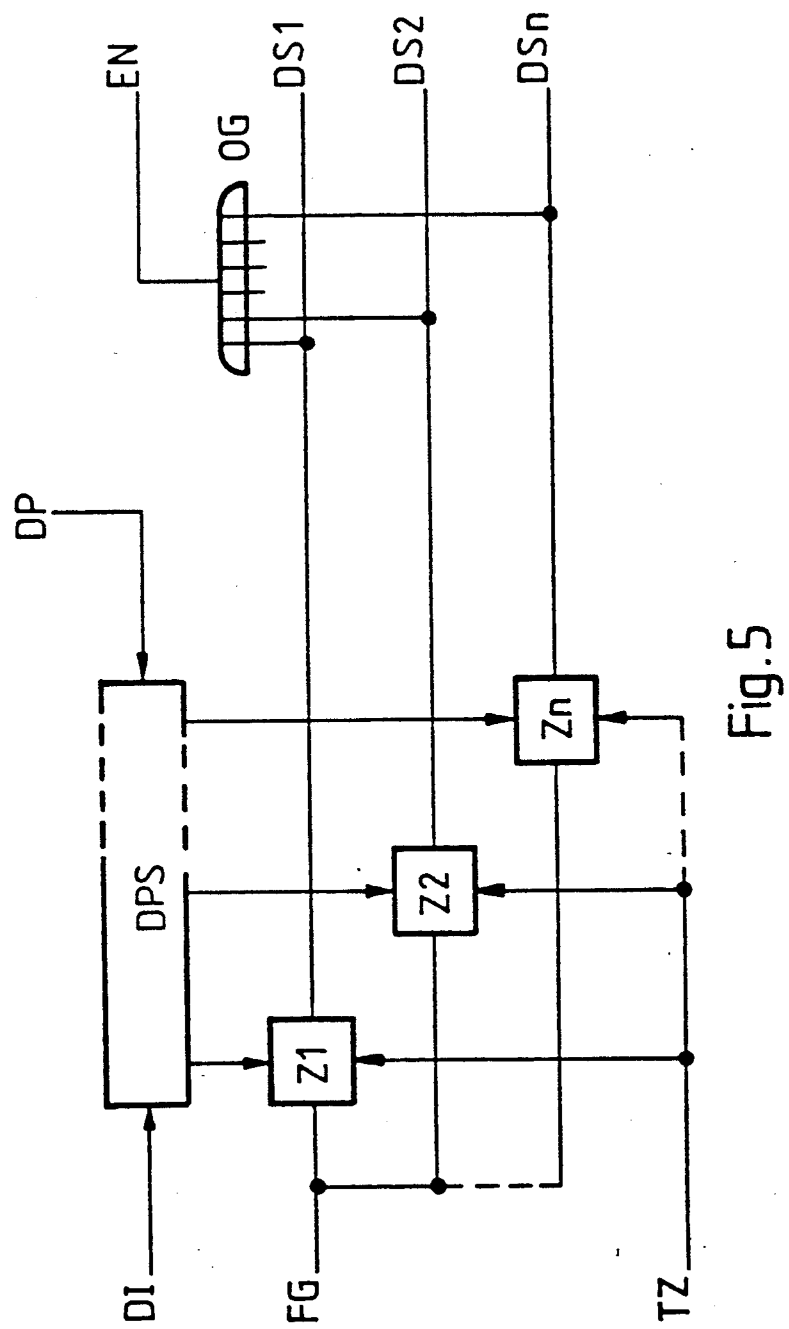
FIG. 5 is the block diagram for producing the recording time.

The block diagrams in FIG. 4 and FIG. 5 show the systems for producing control signals for the recording device S in accordance with FIG. 2. The recording device S consists of a large number of arrayed individual blocks DK1 to DKn corresponding to one recording line; each of the thermally loosely coupled blocks DK has the same dimensions and its own temperature sensor (not shown), i.e., the temperature sensor TS4 shown in FIG. 2 basically consists of n temperature sensors. Each temperature sensor of a block DK is connected by its own line with the analog multiplexer AM in accordance with FIG. 3. As was mentioned earlier, a block DK can either be designed in such a way that it has only the pointwise resistance elements of a single line, or it can contain a matrix arrangement of resistance elements, which allows the simultaneous recording of complete letters, numerals or symbols. Each individual resistance element or semiconductor element which is arranged on the common substrate of a block DK together with the temperature sensor is controlled through an individual amplifier V. A shift register SR and an intermediate memory ZS with one bit location each per amplifier V are present for the information of a block DK. The recording device thus has n shift registers SR and n intermediate memories ZS. The shift registers SR1 to SRn are connected in series and hold the entire recording information of a line of points or letters.

The recording information is supplied to the input D; the production of this information will not be further discussed in this description of the device of the invention. In a facsimile machine, the recording information corresponds to the scanning information of a scanning line of the complementary machine, whereas in connection with use as a printer, the recording information, which is present, for example, in the form of ASCII characters, is converted in a corresponding character generator to the corresponding point information of the matrix.

Due to the delayed thermal response of the resistance elements, at the beginning of a new recording cycle, the initial temperature of a resistance element that has just recorded a point is different from that of a resistance element that has remained in the resting state (not activated) for at least one recording cycle. To create uniform conditions for both situations, those resistance elements which were not activated in the preceding recording cycle must be raised to the same initial temperature by a prepulse, so that these resistance elements have the same temperature as the resistance elements that were active during the preceding recording cycle.

In the present example, therefore, the recording information for the input D must be input twice in succession. In the first operation, the comparator VG is activated by the control input VU, so that the information from the preceding recording operation arriving at the output AG of the shift register SRn is fed into the comparator VG, and the preheating information is determined by comparison with the new recording information at the input D, i.e., a determination is made as to which recording elements of the blocks DK were not heated during the preceding recording process. After the complete information of a line is contained in the shift registers SR, controlled by the stepping timer TR, those resistance elements in the shift registers SR1 to SRn are marked which were not heated during the preceding recording process. The transfer of the information located in the shift registers SR to the intermediate memories ZS is controlled by the enabling circuit F. The output of the intermediate memory ZS prepares the corresponding gate G. After the information from the shift register SR is accepted in the intermediate memory ZS, the shift register SR is free again and is able to directly accept information at the input D of the comparator VG, which is locked during the next loading operation.

The duration of heating of the resistance elements in blocks DK1 to DKn during both the preheating operation and the recording operation is controlled by circuits DS1 to DSn as a function of the signals of the temperature sensors TS4 in blocks DK1 to DKn, as a function of the signals of temperature sensor TS3 of the preheating device and/or as a function of other printing parameters (type of data carrier, type of information of the chip card etc.).

The printing parameters are determined by the processor P (FIG. 3) from various factors, namely, the type of data carrier A (the specific recording and erasing temperature range), the measurement of contrast by the optical sensor SE, the temperature of the preheating device V (temperature sensor TS3) and the temperature of the recording device S (temperature sensor TS4). The specified values, which are supplied in digital form to the processor P (FIG. 3), are used to determine the printing parameters, which are either stored in memories SP1 to SP3 or are dynamically calculated. Before the enabling signal F, the printing parameters are transferred to the printing parameter memory DPS by the processor P (FIG. 3). This information is used to set the counters Z1 to Zn, which are controlled by the circuit FG. The counters are then acted upon with the timer TZ and count backwards to step 0. In the course of the counting, the enabling signals appear in the circuits DS1 to DSn, which release the corresponding gates G of a block DK. The given counter position is determined by the processor P (FIG. 3) as a function of the signal of the given temperature sensor of the given block DK. As soon as the last counter has reached its starting position again, a signal EN is produced via the OR gate OG, which triggers the further operations of the recording process. The enabling signal F releases the intermediate memories ZS, enabling them to accept the actual recording information from the shift registers SR, which has been loaded in the meantime, so that a preparatory release of the gate G in question occurs. The printing parameters DP are again loaded into the printing parameter memory DPS (this time the printing parameters for the actual recording process are loaded), and this is characterized by the circuit DI. The counters Z1 to Zn are set and counted down in the manner already described, so that gate G is released, and the resistance elements of blocks DK are heated via the amplifiers V.

Figure 6:
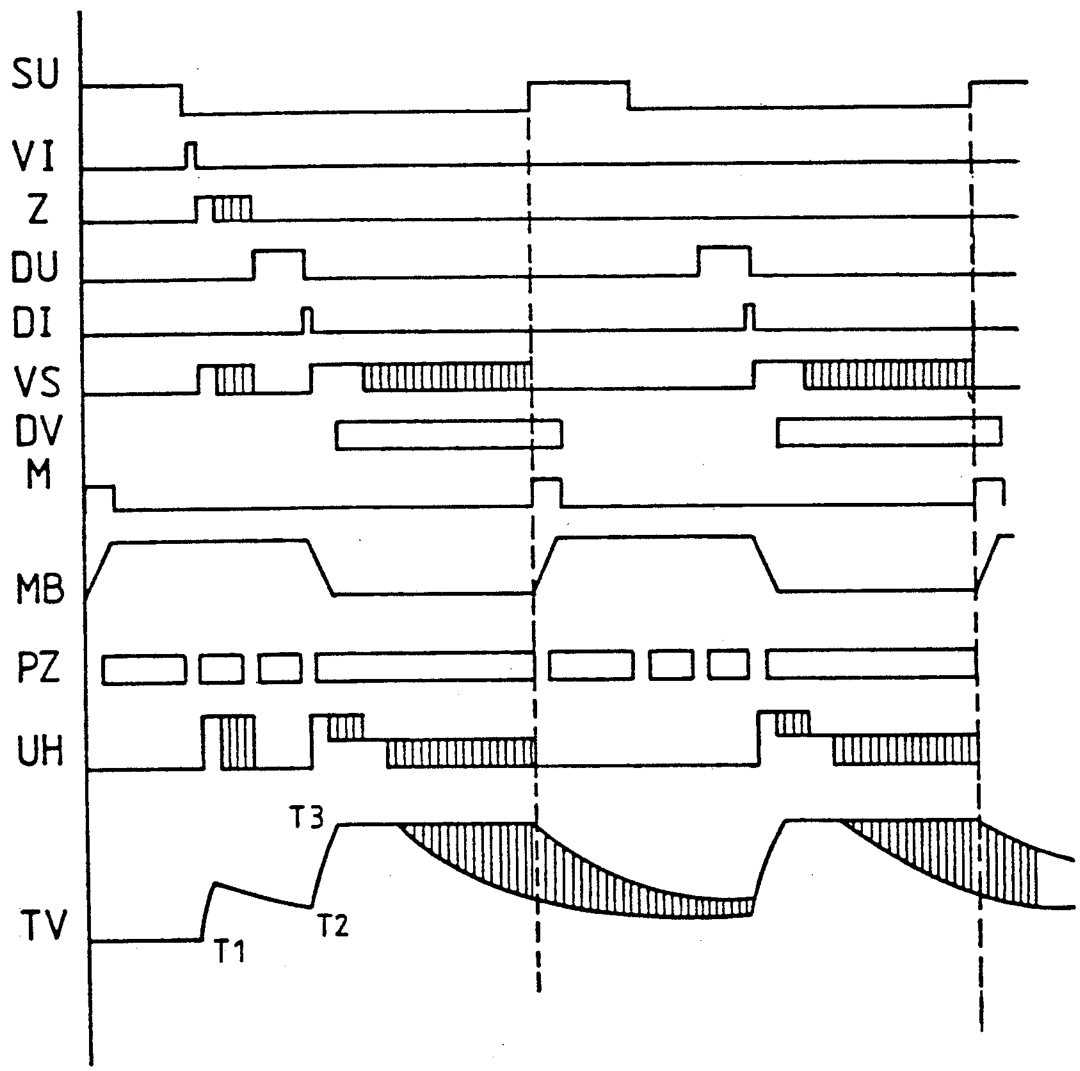
FIG. 6 is a time diagram with the individual operations during a printing operation.

The diagram in FIG. 6 shows the processes described above as a function of time. The loading of the preheating information is indicated in line SU. VI identifies the loading of the parameters for the preheating process and the transfer of information into the intermediate memory ZS. Line Z indicates the variable duration of the release of gates G as part of the preheating process (see FIG. 4). DU indicated the loading of the recording information, and DI identifies the loading of the parameters for the recording process into the printing parameter memory DPS (see FIG. 5). VS shows the flow of current at the output of the amplifiers V, and DV shows the actual recording process. M indicates the stepping impulse of the motor or motors used to advance the data carrier A (see FIG. 2). MB shows the movement of the motor, and PZ shows the free time of the processor P (see FIG. 3). UH indicates the supply voltage of the individual heating elements or resistors. Finally, the temperature behavior of the substrate of a block DK is labeled TV. On the left side of the graph of the time sequences, it is assumed that the heating element or resistor in question was not used in the preceding recording process and thus does not have the necessary temperature, while in the following recording process the heating element or resistor already has the necessary temperature and thus does not need a preheating impulse. The vertical markings in lines Z and VS indicate that the counting time of the counters Z (see FIG. 5) can be varied by means of the printing parameters and is determined by the given temperature conditions of the individual blocks DK.

To be able to record the data carrier A at maximum speed, it is necessary to achieve the required recording temperature T3 (see signal TV) as quickly as possible on the surface of the resistance elements and then to maintain it at a constant level for the recording interval. If the resistance elements were operated at a constant voltage, the surface temperature would approach temperature T3 in accordance with an exponential function. The temperature behavior shown in line TV in FIG. 6 is achieved by operating the resistance elements to be activated at an increased voltage at the beginning of each recording cycle to drive the temperature in the direction of 300° to 400° C. in accordance with an exponential function. As soon as the temperature has reached the required value T3, the operating voltage is reduced to a value such that temperature T3 is held constant (see signal UH). Since the attainment of temperature T3 is a function of the temperature of the block, the time interval for which the increased voltage is applied must be variable, which is accomplished by a timer controlled by the processor P or by the sequence control IST (see FIG. 3).

The voltage curve UH shown in FIG. 6 can be produced, for example, by switching the reference voltage of the power supply unit for the resistance elements through the output signals of a timer, whose interval is in turn adjusted via an I/O port by the processor P or the internal sequence control IST in accordance with FIG. 3. The output signal of the timer controlling the power supply unit (not shown) is labeled TS.

The recording device S shown in FIG. 2, which works by the contact heat principle, can be replaced by devices that supply the energy in the form of radiation. Radiation sources that can be used include lasers, pulsed xenon lamps, and lamps and LED chains that emit constantly visible or invisible radiation. In the case of radiation sources that do not produce a point-focused beam of energy, it is also necessary to interpose an optical shutter mechanism. Examples of such mechanisms are an "LCD shutter" or a row of electrostatically or magnetically activated windows. To accelerate the conversion of radiant energy to heat in the heat-sensitive layer WS of the data carrier A and to improve the effective radius of the conversion, starter particles can be incorporated in the layer, as is described in European Patent 0 014 826.

Figure 7A:
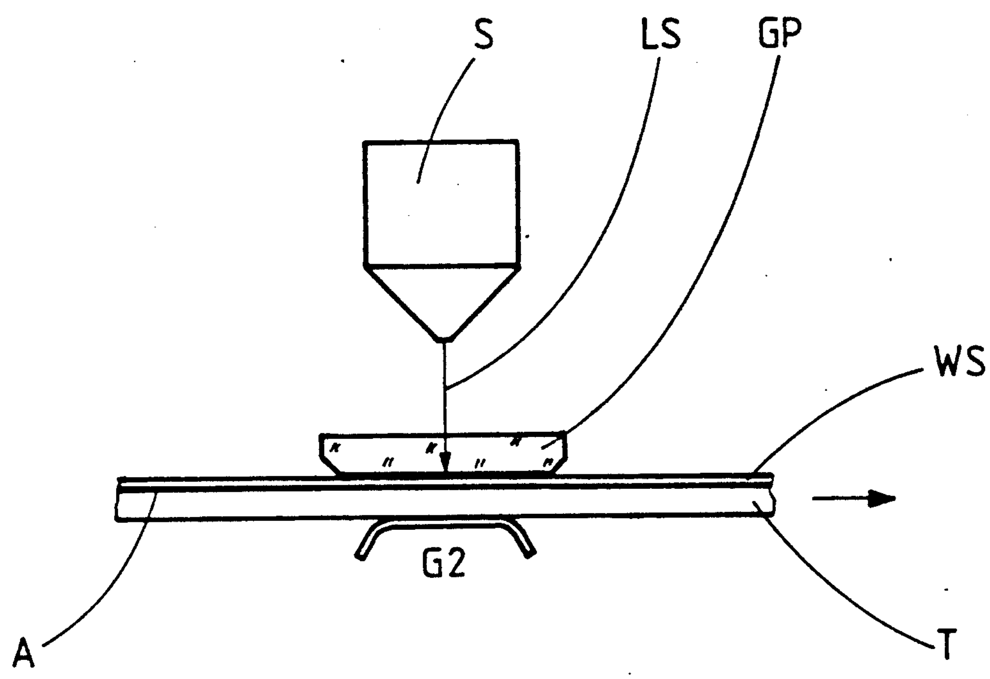
FIGS. 7 (*a–d*) show various forms of the recording device.

FIG. 7*a* shows a recording device which uses a laser beam LS as the energy source. A pressure roller or opposing surface G2 presses the heat-sensitive layer WS of the data carrier A against a glass plate GP, which is heated to the preheating temperature. To record information, the laser beam LS is passed line by line over the glass and is turned on at those locations at which a point is to be recorded. During the recording process, the data carrier A is advanced continuously or intermittently. The energy of the laser beam LS is converted to heat partly in the heat-sensitive layer WS itself (possibly with the assistance of starter particles incorporated in the layer) and partly on the absorbing support T, which then leads to the desired change in state in the heat-sensitive layer WS.

It is also possible to apply a layer that absorbs radiant energy on the side of the glass plate GP facing the data carrier A; of course such a layer must be separated from the glass plate GP by a thermally insulating separating layer. This measure converts the recording process to a contact heat process. It is also possible for the layer applied to the glass plate GP to be semitransparent, so that about half of the energy is converted to heat above the heat-sensitive layer WS, and the other half is converted to heat below the heat-sensitive layer WS. This further accelerates the conversion process.

Another variation consists in dividing the glass plate GP in the region of the laser beam LS or installing it as a preheating device V below the recording device S, so that the laser beam LS can record directly on the data carrier A.

The energy for recording on different heat-sensitive materials and for compensating for fluctuations in the preheating temperature can be dosed by the following individual measures or combinations thereof:

1. variation of the energy of the laser beam
2. modulation of the pulse width
3. increase in the recording rate of the laser beam together with an increase in the rate of advance of the data carrier A.

Figure 7B:
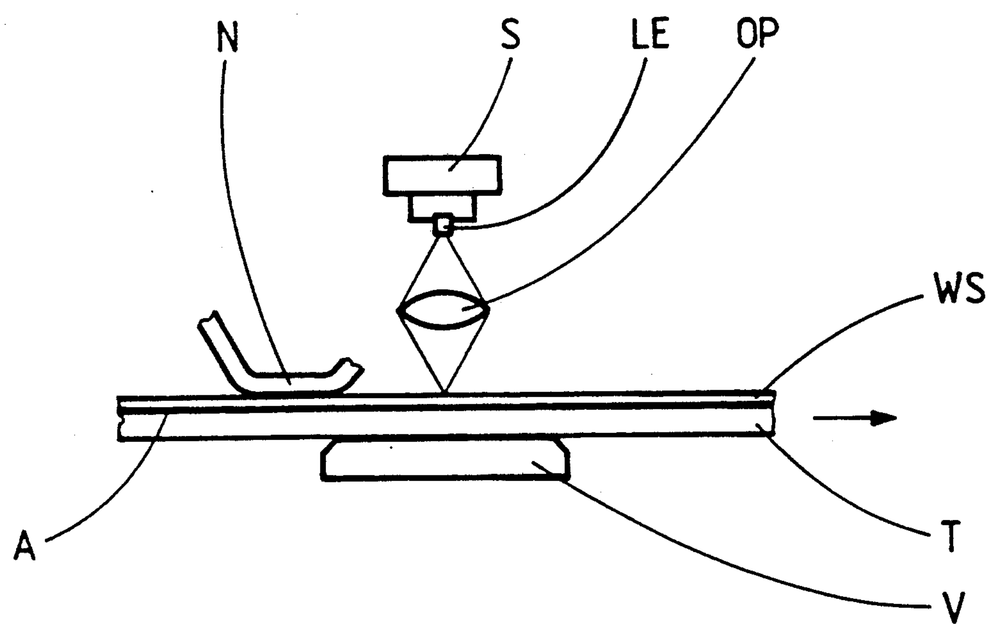

Instead of the laser beam described above, it is possible to use a row of light-emitting diodes LE that emit infrared or visible light; the spacing corresponds to the horizontal resolution of the symbols to be recorded on a recording line (FIG. 7*b*). To record a line, we briefly pulse those light-emitting diodes LE below which a point is to be recorded on the data carrier A. To focus the optical energy of the light-emitting diode LE on the points to be recorded, a bar-shaped lens OP can be optionally used; this lens extends over the entire width of the data carrier A. The data carrier A is preheated by a preheating device V, which is arranged on the underside of the data carrier A. The preheating device V is designed as a plate, against which the data carrier A is pressed by device N.

The energy for recording on different heat-sensitive materials and for compensating for fluctuations in the preheating temperature can be dosed by the following individual measures or combinations thereof:

1. variation of the energy of the light-emitting diodes
2. modulation of the pulse width
3. shortening of the pulse widths of the light-emitting diodes together with an increased rate of advance of the data carrier A.

Figure 7C:
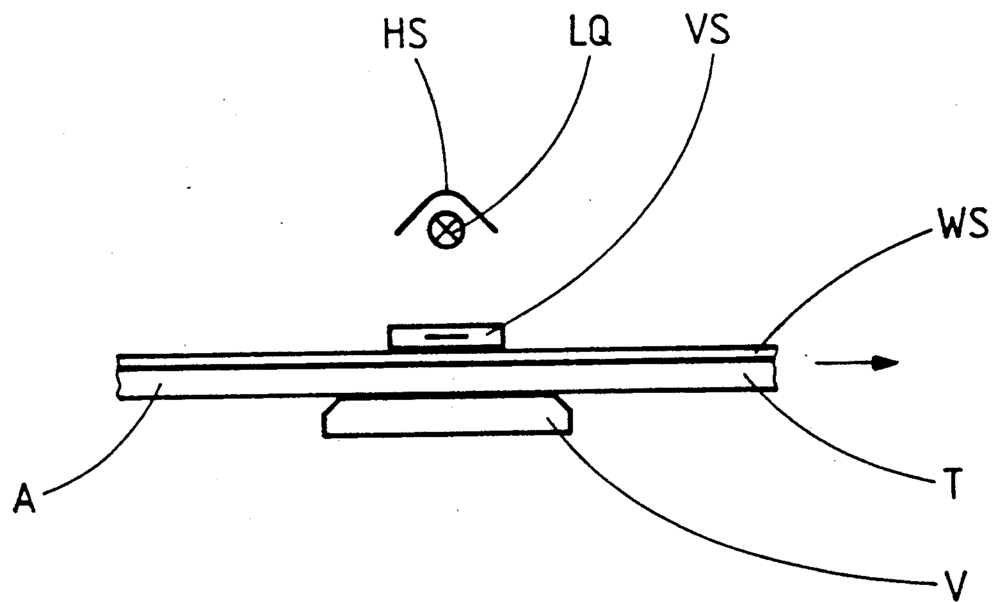
Figure 7D:
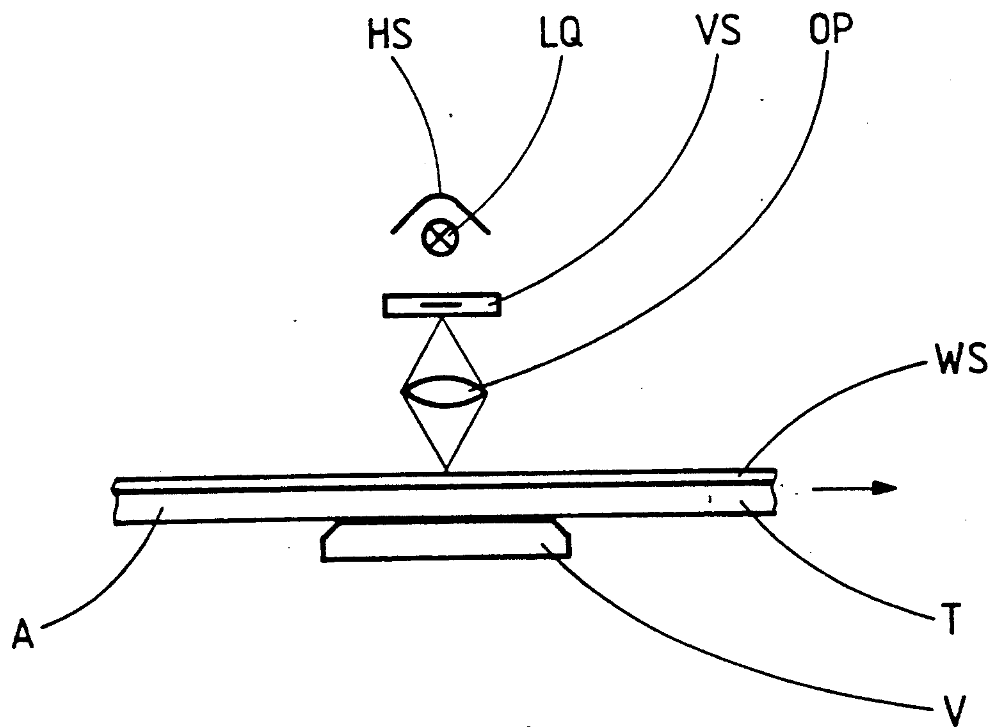

A tubular xenon flash lamp LQ can also be used as the energy source (see FIGS. 7*c* and 7*d*), which extends over the entire width of the data carrier A and which is focused on the heat-sensitive layer WS of the data carrier A, for example, by a concave mirror HS. In this case, however, an optical shutter mechanism VS is additionally required, which allows passage of the energy produced by the flash lamp only at those locations at which a point is to be recorded. Examples of such a mechanism VS are an LCD shutter or an arrangement of electrostatically or magnetically controllable windows, the horizontal spacing of which corresponds to the horizontal resolution of the lines to be recorded.

The optical shutter VS can be positioned directly above the data carrier A, or the light flashes that they allow to pass are projected onto the data carrier A by a bar-shaped lens OP, which extends over the entire width of the data carrier A. These optics OP can be expanded by interposing a glass plate GP, as described above in connection with the use of a laser, to permit heating of the heat-sensitive layer WS on both sides, possibly by providing a partially light-absorbing layer.

The xenon flash lamp LQ draws the electrical energy necessary for its operation from a charged capacitor, which is then discharged on ignition of the lamp. The capacitor is recharged as the data carrier A is being advanced by one line. The energy for recording different heat-sensitive materials and for compensating for fluctuations in the preheating temperature can be dosed by varying the charging voltage of the capacitor, possibly in conjunction with an increased advance speed of the data carrier A.

Instead of a xenon flash lamp LQ, it is also possible to use an incandescent lamp; however, this places special requirements on the linearity of the filament, since this must be projected into the optical shutter VS. The lamp is positioned, and the optical shutter VS is focused and positioned in the same ways as described for the xenon flash lamp LQ.

The energy for recording on different heat-sensitive materials and for compensating for fluctuations in the preheating temperature can be dosed by varying the operating voltage of the lamp, possibly in conjunction with variation of the advance speed of the data carrier A. The intensity of the laser beam LS or of the light-emitting diodes LE or the open time of the optical shutter VS can be controlled with respect to the individual point to be recorded in the same way that the heating of the resistance elements in accordance with FIGS. 3 to 5 is controlled. However, the measures discussed in connection with the preheating impulse are not required in these cases. While the blocks DK are replaced by the corresponding light-emitting diodes LE and optical shutters VS, such that there is one light-emitting diode or one controllable window of the shutter VS for each point to be recorded on the data carrier A, the output signal of the gates G is used for modulation of the laser beam LS by suitable means. The amount of time that voltage is applied to the individual light-emitting diodes LE or the open time of the individual windows of the shutter VS is determined by the printing parameters in the manner described above. The intensity or the dwell time of the laser beam LS as it moves line by line over the data carrier A is also determined as a function of the printing parameters for each point to be recorded, as described with reference to FIGS. 3 to 5.

It should also be pointed out that the control and display device BA in accordance with FIG. 3 can be used, for example, to manually adjust the device of the invention in such a way that the device is used only for performing erasing operations. The data carrier A in accordance with FIG. 2 is designed in the form of a sheet, e.g., in the dimensions of standard commercial paper formats.

The invention can be used not only for recording information on a data carrier of the type described at the beginning, but also for recording on a data carrier based on a similar principle. It is also possible to use the device of the invention in such a way that not only the data carrier described above, but also ordinary heat-sensitive paper can be recorded on by making suitable switches. The device of the invention can also be combined with other conventional printing mechanisms. In this regard, when a multisectional magazine is present, it is possible to switch automatically to the desired printing mechanism, depending on the type of data carrier that is present (heat-sensitive paper, erasable data carrier, standard paper), or to switch manually from the paper feed.

I claim:

1. Device for recording information in columns and rows on a data carrier that has a layer the optical properties of which can be influenced by different temperatures, such that, starting from a first temperature (for example, room temperature) and a first optical state (e.g., opaque), the layer can be changed to a second optical state (e.g., transparent) by heating to a second temperature, and this change can be rendered permanent by cooling to the first temperature and can later be reversed by heating the layer, which is now in the second optical state, from the first temperature to a third temperature and then cooling it again, such that the second temperature is greater than the first temperature, and the third temperature is greater than the second temperature, characterized by an erasing device (L), a cooling device (K), a preheating device (V), and a recording device (S), such that the erasing device (L) heats the layer (WS) to the third temperature (T2) or to the second temperature (T1), the cooling device (K) cools the layer (WS) to the first temperature (T0), the preheating device (V) heats the layer (WS) to the fourth temperature, which lies between the first temperature (T0) and the second temperature (T1) or third temperature (T2), and the recording device (S) heats the appropriate sites on the layer (WS) to the third temperature (T2) or the second temperature (T1), as a function of the information to be recorded; during this process the sheetlike data carrier (A) passes in succession through the indicated devices, each of which extends over the full width of the data carrier (A), in the indicated order (L, K, V, S); the preheating device (V) is situated very close to the recording device (S) or is actually part of the recording device; the recording energy is controlled as a function of the signals of thermal and/or optical sensing devices (SE, TS), and the information recorded on the data carrier (A) by the recording device (S) is checked by the optical sensing device (SE).

2. Device in accordance with claim 1, characterized by the fact that the preheating device (V) acts on the side of the data carrier (A) turned away from the layer (WS).

3. Device in accordance with claim 2, characterized by the fact that the preheating device (V) extends into the region of the recording device (S).

4. Device in accordance with claim 1, characterized by the fact that the preheating device (V) is designed as a pressure roller (R5) for the recording device (S).

5. Device in accordance with claim 1, characterized by the fact that the temperature of the erasing device (L) is controlled by the signals of a second optical sensor (SL), which checks the erased data carrier (A).

6. Device in accordance with claim 1, characterized by the fact that temperature sensors (TS1, TS2, TS3, TS4) are provided in the erasing device (L) and/or in the cooling device (K) and/or in the preheating device (V) and/or in the recording device (S), and that the temperatures of the devices (L, K, V, S) are controlled as a function of the signals of the temperature sensors (TS1 to TS4).

7. Device in accordance with claim 1, characterized by the fact that a control device (P) is provided, to which the signals of the optical sensors (SE, SL) and/or the signals of the temperature sensors (TS1 to TS4) are supplied, and which controls the temperature of the erasing device (L), the cooling device (K), the preheating device (V) and/or the recording device (S).

8. Device in accordance with claim 7, characterized by the fact that the control device (P) controls the temperature of the preheating device (V) and/or the recording device (S) as a function of the information to be recorded on the data carrier.

9. Device in accordance with either of claims 7 to 8, characterized by the fact that the recorded information of one line is logically connected with the recorded information of the preceding line, that the columns to be recorded first are determined, and that the preheating device (V) and/or the recording device (S) are heated to a certain temperature in the determined columns before the actual recording process.

10. Device in accordance with claim 7, characterized by the fact that the values of the temperature sensors (TS1 to TS4) and/or the values of the optical sensors (SE, SL) are compared with the values stored in one or more memories of the control device (P).

11. Device in accordance with claim 10, characterized by the fact that the values are partially or completely contained in the memory of a chip card, and that a suitable card reader (LE) is connected to the control device (P).

12. Device in accordance with either of claims 10 or 11, characterized by the fact that a reading device (LE) is provided, that the data carrier (A) contains information, which is read by the reading device (LE) before the beginning of the erasing or recording process and supplied to the control device (P), and that this information includes data on the necessary erasing and/or recording temperatures.

13. Device in accordance with claim 1, characterized by the fact that the recording device (S) can be switched off.

14. Device in accordance with claim 1, characterized by the fact that the recording device (S) is designed as a laser beam source, such that the laser beam (LS) passes line by line over the data carrier (A) and is switched on and off according to the information to be recorded, and that the energy of the laser beam (LS) or the length of time the laser beam is turned on is controlled by signals produced by the optical sensor (SE).

15. Device in accordance with claim 1, characterized by the fact that the recording device (S) is designed as light-emitting diodes (LE) arranged in a row, the light beams of which may be focussed, by a bar-shaped lens (OP), such that one diode is provided for each point to be recorded, and each diode is switched on or off according to the information to be recorded, and that the energy of the diodes or the interval of time they are turned on is controlled by signals of the optical sensor (SE).

16. Device in accordance with claim 1, characterized by the fact that the recording device (S) consists of a tubular light source (LQ) and an optical shutter (VS) located between the light source and the data carrier (A), such that the open time of the shutter (VS), which controls the light beam for each point to be recorded, or the energy of the light source (LQ) is controlled by the signals of the optical sensor (SE).

* * * * *